United States Patent
Inoue et al.

(10) Patent No.: US 6,928,809 B2
(45) Date of Patent: Aug. 16, 2005

(54) EXHAUST GAS PURIFICATION SYSTEM AND METHOD

(75) Inventors: Takao Inoue, Yokohama (JP); Junichi Kawashima, Kanagawa (JP); Naoya Tsutsumoto, Yokohama (JP); Makoto Otake, Yokohama (JP); Terunori Kondou, Yokohama (JP); Toshimasa Koga, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 10/751,883

(22) Filed: Jan. 7, 2004

(65) Prior Publication Data

US 2004/0134187 A1 Jul. 15, 2004

(30) Foreign Application Priority Data

Jan. 8, 2003 (JP) ........................................ 2003-001973

(51) Int. Cl.[7] ................................................ F01N 3/00
(52) U.S. Cl. ............................ 60/297; 60/277; 60/285; 60/297; 60/311; 55/DIG. 30
(58) Field of Search ........................ 60/274, 277, 285, 60/286, 295, 297, 311; 55/DIG. 30

(56) References Cited

U.S. PATENT DOCUMENTS

| | | | | |
|---|---|---|---|---|
| 5,195,316 A | * | 3/1993 | Shinzawa et al. | 60/274 |
| 5,287,698 A | * | 2/1994 | Shinzawa et al. | 60/286 |
| 5,319,930 A | | 6/1994 | Shinzawa et al. | |
| 6,405,528 B1 | * | 6/2002 | Christen et al. | 60/295 |
| 6,622,480 B2 | * | 9/2003 | Tashiro et al. | 60/295 |
| 6,786,041 B2 | * | 9/2004 | Itoh et al. | 60/274 |
| 2001/0010152 A1 | | 8/2001 | Tallee et al. | |
| 2002/0189247 A1 | * | 12/2002 | Kato et al. | 60/297 |
| 2003/0131592 A1 | * | 7/2003 | Saito et al. | 60/295 |
| 2003/0136117 A1 | * | 7/2003 | Megas | 60/297 |

FOREIGN PATENT DOCUMENTS

| | | |
|---|---|---|
| EP | 1 229 223 A1 | 8/2002 |
| JP | 2000-234509 A | 8/2000 |
| WO | WO 03/100227 A1 | 12/2003 |

OTHER PUBLICATIONS

U.S. Appl. No. 10/752,427, filed Jan. 7, 2004, Takao Inoue et al.
U.S. Appl. No. 10/752,518, filed Jan. 8, 2004, Toshimasa Koga et al.
U.S. Appl. No. 10/752,519, filed Jan. 8, 2004, Toshimasa Koga et al.
U.S. Appl. No. 10/755,316, filed Jan. 13, 2004, Makoto Otake et al.
U.S. Appl. No. 10/756,501, filed Jan. 14, 2004, Terunori Kondou et al.

* cited by examiner

*Primary Examiner*—Tu M. Nguyen
(74) *Attorney, Agent, or Firm*—Foley & Lardner LLP

(57) ABSTRACT

An exhaust gas purification system includes a particulate filter, a sensor that detects a filter differential pressure and a controller that controls regeneration of the particulate filter. The controller is programmed to execute a control for burning particulate accumulated on the particulate filter, determine whether regeneration of the particulate filter is completed, detect, in cooperation with the sensor, a filter differential pressure immediately after it is determined that regeneration of the particulate filter is completed, and estimate an ash accumulation amount based on the detected filter differential pressure. An exhaust gas purification method is also provided.

10 Claims, 6 Drawing Sheets

EXHAUST GAS PURIFICATION SYSTEM AND METHOD

BACKGROUND OF THE INVENTION

The present invention relates to an exhaust gas purification system having a particulate filter used for aftertreatment of an exhaust gas mainly of a diesel engine and more specifically to a technology for dealing with ash accumulated on a particulate filter. The present invention further relates to an exhaust gas purification method for an internal combustion engine.

A diesel particulate filter is a particulate trapping device consisting of a honeycomb monolith made of ceramic or the like and generally used for removing particulate matters (hereinafter referred to as particulate) emitted from a diesel engine. During operation of the engine, the particulate is accumulated on the diesel particulate filter increasingly. At some time when the accumulated amount of particulate exceeds an allowable amount, the diesel particulate filter is clogged to cause the exhaust pressure to become higher, thus causing a bad influence on the performance efficiency of the engine. For this reason, the accumulated particulate is burnt periodically so as to prevent clogging of the particulate filter.

Particulate is a general term for particulate matters in the exhaust gas and contains incombustible matters other than combustible matters such as soot. Representative one of the incombustible matters is calcium sulfate that is a product of burnt additives of engine oil. The incombustible matters such as calcium sulfate are emitted from the engine as particulate components and accumulated on the diesel particulate filter. Differing from other particulate matters such as soot, the incombustible matters cannot be removed by regeneration treatment that is carried out with a view to burning the particulate but remains on the diesel particulate filter as powdery residue (hereinafter referred to as ash) after regeneration. Accumulation of an excess amount of ash on the diesel particulate filter not only causes a rise of exhaust pressure but a decrease in the effective filtration area and therefore a decrease in the ability of the diesel particulate filter. Thus, when the accumulated amount of particulate exceeds an allowable value, it becomes necessary to take a particular step such as a step for replacement of the diesel particulate filter.

In this connection, as a measure against ash there is known such a method of assuming that accumulation of a predetermined amount of ash on a diesel particulate filter occurs per a predetermined mileage and removing the particulate from the diesel particulate filter each time of running of a vehicle over the predetermined mileage as disclosed in Unexamined Japanese Patent Publication No. 2000-234509.

SUMMARY OF THE INVENTION

The above-described method that approximates a constant proportional relation between the amount of ash accumulated on the diesel particulate filter and the mileage of the vehicle encounters the following problem.

The consumption of engine oil that is causative of ash differs from engine to engine. Even in the same engine, the consumption of engine oil varies depending upon a variation of a history of operation of the engine (or the history of running of the vehicle). Thus, the amount of ash emitted from the engine and accumulated on the diesel particulate filter during running of the vehicle over a predetermined mileage differs from engine to engine and vehicle to vehicle.

Further, the amount of ash resulting from a unit amount of engine oil varies depending upon a variation of a concentration of ash-causative components (i.e., components causative of ash) contained in the engine oil. But, the concentration of ash-causative components varies depending upon a variation in the kind of engine oil. For this reason, the amount of ash accumulated during a predetermine mileage of a vehicle varies depending upon a variation in the kind of engine oil.

Thus, for accurately estimating the amount of ash accumulated on the diesel particulate filter based on the mileage of the vehicle, the difference in the consumption of engine oil from engine to engine or from vehicle to vehicle and the kind of engine actually used must be reflected on the estimation. However, consideration of all of such factors makes the computing operation difficult and is therefore not practically useful. As a safety measure for preventing excessive accumulation of ash easily, it is considered to estimate an amount of ash accumulated during a unit mileage of the vehicle on the large side, this will result, in most cases, in too early replacement of the diesel particulate filter.

It is accordingly an object of the present invention to provide an exhaust gas purification system for an internal combustion engine that can estimate easily and accurately the amount of ash accumulated on a diesel particulate filter (hereinafter referred to as ash accumulation amount) without depending upon a variation of a consumption of engine oil or the like and can determine the time to take a measure against accumulation of ash accurately.

To achieve the above object, there is provided according to an aspect of the present invention an exhaust gas purification system for an internal combustion engine comprising a particulate filter that is disposed in an exhaust passage of the engine and traps particulate in an exhaust gas, a sensor that detects a filter differential pressure between an inlet and an outlet of the particulate filter, and a controller that controls regeneration of the particulate filter, the controller being programmed to execute a control for burning particulate accumulated on the particulate filter and thereby regenerating the particulate filter, determine whether regeneration of the particulate filter is completed, detect, in cooperation with the sensor, the filter differential pressure immediately after it is determined that the regeneration of the particulate filter is completed, and estimate an ash accumulation amount based on the detected filter differential pressure.

According to another aspect of the present invention, there is provided an exhaust gas purification system for an internal combustion engine comprising a particulate filter that is disposed in an exhaust passage of the engine and traps particulate in an exhaust gas, regeneration control means that executes a control for burning particulate accumulated on the particulate filter and thereby regenerating the particulate filter, regeneration completion determining means that determines whether regeneration of the particulate filter is completed, filter differential pressure detecting means that detects a filter differential pressure that is a differential pressure between an inlet and outlet of the particulate filter immediately after it is determined that the regeneration of the particulate filter is completed, and ash accumulation amount estimating means that estimates an ash accumulation amount that is an amount of ash accumulated on the particulate filter based on the detected filter differential pressure.

According to a further aspect of the present invention, there is provided an exhaust gas purification system for an internal combustion engine comprising a particulate filter that is disposed in an exhaust passage of the engine and traps particulate in an exhaust gas, and a controller that controls regeneration of the particulate filter, the controller being programmed to execute a control for burning particulate accumulated on the particulate filter and thereby regenerating the particulate filter, detect a filter differential pressure between an inlet and an outlet of the particulate filter immediately after the particulate filter is regenerated, and determine a time to take action against ash accumulated on the particulate filter based on the detected filter differential pressure.

According to a further aspect of the present invention, there is provided an exhaust gas purification method for an internal combustion engine having a particulate filter disposed in an exhaust passage of the engine and trapping particulate in an exhaust gas, the method comprising executing a control for burning particulate accumulated on the particulate filter and thereby regenerating the particulate filter, determining whether regeneration of the particulate filter is completed, detecting a filter differential pressure between an inlet and an outlet of the particulate filter immediately after it is determined that regeneration of the particulate filter is completed, and estimating an ash accumulation amount that is an amount of ash accumulated on the particulate filter based on the detected filter differential pressure.

DESCRIPTION OF THE PREFERRED EMBODIMENT

Figure 1:
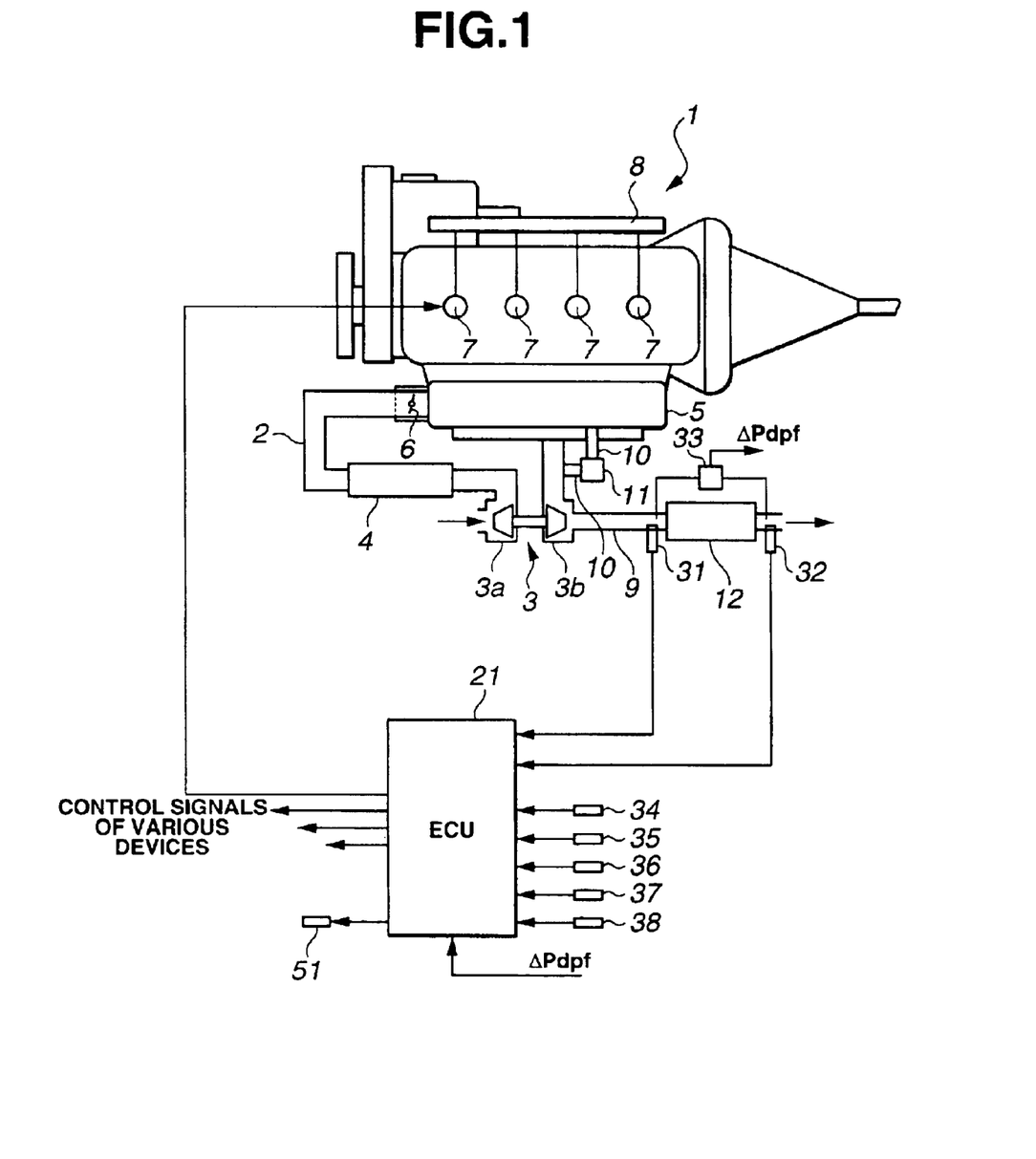
FIG. 1 is a schematic view of a diesel engine equipped with an exhaust gas purification system according to an embodiment of the present invention.

Referring first to FIG. 1, a direct injection diesel engine (hereinafter referred to simply as engine) is generally indicated by 1.

Engine 1 includes intake passage 2 that has at an inlet portion thereof an air cleaner (not shown) by which dust contained in intake air is removed. Downstream of the air cleaner is disposed compressor portion 3a of variable nozzle turbocharger (hereinafter referred to simply as turbocharger) 3. The intake air having passed the air cleaner is compressed by compressor portion 3a and sent forward. Downstream of compressor portion 3a is disposed intercooler 4 by which the intake air sent forward from compressor portion 3a is cooled. Further, immediately upstream of surge tank 5 is disposed throttle valve 6 so that the cooled intake air is caused to flow through throttle valve 6 into surge tank 5 and then distributed to respective cylinders (not shown) by way of manifold portions (not shown).

Injectors are indicated by 7 and fixed to a cylinder head (not shown) so as to face combustion chamber upper central portions of the cylinders, respectively. A fuel system of engine 1 includes common rail 8 so that fuel pumped by a fuel pump (not shown) is supplied through common rail 8 into injectors 7, respectively. Injectors 7 are actuated in response to a fuel injection control signal supplied thereto from electronic control unit (hereinafter referred to as ECU) 21. Injection of fuel by means of injector 7 consists of a plurality of divided portions and carried out dividedly. Namely, injector 7 carries out, other than a main injection for controlling a torque of engine 1, a pilot injection for decreasing particulate and a post injection for elevating the temperature of the exhaust gas at the time of regeneration of diesel particulate filter 12 that will be described later. The pilot injection is carried out in advance of the main injection, and the post injection is carried out in retard of the main injection.

On the other hand, at a location downstream of the manifold portions, exhaust passage 9 is provided with turbine portion 3b of turbocharger 3. The vane angle of movable vanes of turbine portion 3b is controlled in response to a supper charging pressure control signal. At a location downstream of turbine portion 3b is disposed diesel particulate filter 12. Particulate contained in the exhaust gas is removed by diesel particulate filter 12 when the exhaust gas passes through diesel particulate filter 12. Further, between exhaust passage 9 and intake passage 2 (herein, surge tank 5) is disposed exhaust gas recirculation (hereinafter referred to as EGR) pipe 10 and connected thereto. EGR pipe 10 is provided with EGR control valve 11. EGR control valve 11 is operated in response to an EGR control signal so that a suitable amount of exhaust gas corresponding to an opening degree of EGR control valve 11 is recirculated to intake passage 2.

Inputted to ECU 21 are signals from sensors 31, 32 for detecting exhaust gas temperatures Texhin, Texhout at the inlet and outlet of diesel particulate filter 12, sensor 33 for detecting the differential pressure $\Delta Pdpf$ between the inlet and outlet of diesel particulate filter 12 (hereinafter referred to simply as filter differential pressure), airflow meter 34, crank angle sensor 35, accelerator opening degree sensor 36, vehicle speed sensor 37 and sensor 38 for detecting an exhaust gas pressure Pexh at a location adjacent sensor 31. Based on the signals, ECU 21 executes a control for regenerating diesel particulate filter 12 while estimating the ash accumulation amount ASH that is the amount of ash accumulated on diesel particulate filter 12 and urging a driver to replacement of diesel particulate filter 12. To this end, warning lamp 51 is disposed in a passenger compartment of a vehicle.

Then, a control that is executed by ECU 21 for controlling regeration of diesel particulate filter 12 will be described with reference to a flowchart of FIG. 2.

In step S1, it is determined whether or not regeneration time determination flag F is 0 (zero), i.e., flag F indicative of determination on the time to perform regeneration of diesel particulate filter 12 is 0. If regeneration time determination flag F is 0, the control proceeds to step S2. If regeration time determination flag F is not 0, the control proceeds to step 5. In the meantime, regeneration time determination flag F is set to 0 at start of engine 1 and set to 1 at the time regeneration of diesel particulate filter 12 is to be performed.

In step S2, filter differential pressure $\Delta Pdpf$ and exhaust gas flow rate Qexh are read, and based on $\Delta Pdpf$ and Qexh particulate accumulation amount PM that is an amount of particulate accumulated on diesel particulate filter 12 is estimated. Estimation of PM is performed in accordance with a flowchart shown in FIG. 6 that will be described later. Qexh can be calculated based on intake air quantity Qa detected by airflow meter 34, fuel flow rate Qf, exhaust gas temperature Texh at the inlet of diesel particulate filter 12 and exhaust gas pressure Pexh. Pexh may be estimated by retrieval of a map other than actual measurement by using sensor 38. In step S3, it is determined whether or not particulate accumulation amount PM has reached predetermined amount PM1. If the answer in step S3 is affirmative, the control proceeds to step S4. If the answer in step S3 is negative, the control returns. PM1 is predetermined as a value indicative of an upper limit of an allowable particulate accumulation amount. In step S4, regeneration determination flag F is set to 1.

In step S5, in order to elevate the temperature of the exhaust gas and thereby burn the particulate, device control amount increasing and decreasing values dCONT of various engine control devices (hereinafter referred to as controlled devices at regeration) are determined. In this connection, included in controlled devices at regeneration are injectors 7, turbocharger 3, EGR control valve 11 and intake throttle valve 6. By determination of dCONT, one or a plurality of a main fuel injection period, a post injection period and a post injection amount of injectors 7, a vane angle of turbocharger 3, an opening degree of EGR control valve 11 and an opening degree of intake throttle valve 6 are adjusted. Herein, dCONT and its control in case the exhaust temperature is to be elevated are shown.

TABLE 1

| Device | dCONT | Control |
|---|---|---|
| Injector | Main injection period | Retarded |
| | Post injection period | Retarded |
| | Post injection amount | Increased |
| Turbocharger | Turbocharged pressure | Decreased |
| EGR control valve | Opening degree | Opened |
| Intake throttle valve | Opening degree | Closed |

Device control amount increasing and decreasing value dCONT is determined so as to be a value by which device control amount basic value CONT that is determined for use in normal engine control is increased and decreased. dCONT is read from a map in which dCONT is assigned to an engine operating condition (e.g., fuel injection amount Tp and engine speed Ne). A controlled device or devices at regeneration to which dCONT is set vary depending upon a variation of the operating condition (there are two cases, one in which dCONT is set to a single device and another in which dCONT is set to a plurality of devices). In order to attain an exhaust gas temperature (e.g., 600° C.) that enables accumulated particulate to burn actively, dCONT is set with respect to one or more controlled devices at regeneration in accordance with an engine operating condition. In S6, device control amount increasing and decreasing value dCONT is added to device control amount basic value CONT to determine final device control amount CONT (=CONT+dCONT).

In step S7, exhaust gas flow rate Qexh and temperature Tdpf of diesel particulate filter 12 (hereinafter referred to as filter temperature) are read. From Qexh and Tdpf, particulate combustion speed (indicative of an amount of particulate that burns during a unit time) $\Delta PM$ is estimated. Estimation of $\Delta PM$ is performed by reference to a map in which $\Delta PM$ is assigned to Qexh and Tdpf. Filter temperature Tdpf is calculated from an average of exhaust gas temperatures Texhin, Texhout at the inlet and outlet of diesel particulate filter 12 (Tdpf=k×(Texhin+Texhout)/2 where k is a coefficient). In step S8, particulate residual ratio rPM of diesel particulate filter 12 is calculated. Particulate residual ratio rPM is calculated by subtracting a burnt particulate amount from accumulated particulate amount PM that is estimated in step S2 (rPM=PM/(PM−($\Delta PM \times \Delta t$)) where $\Delta t$ is a calculation cycle). In step S9, it is determined whether rPM has decreased to predetermined value R1. If the answer in step S9 is affirmative, the control proceeds to step S10. If the answer in step S9 is negative, the control returns. Value R1 is predetermined so as to indicate that particulate is decreased enough to regenerate diesel particulate filter 12. In step S10, regeneration time determining flag F is set to 0. Then, by the process onward, the exhaust gas temperature is returned to a normal temperature.

Figure 3:
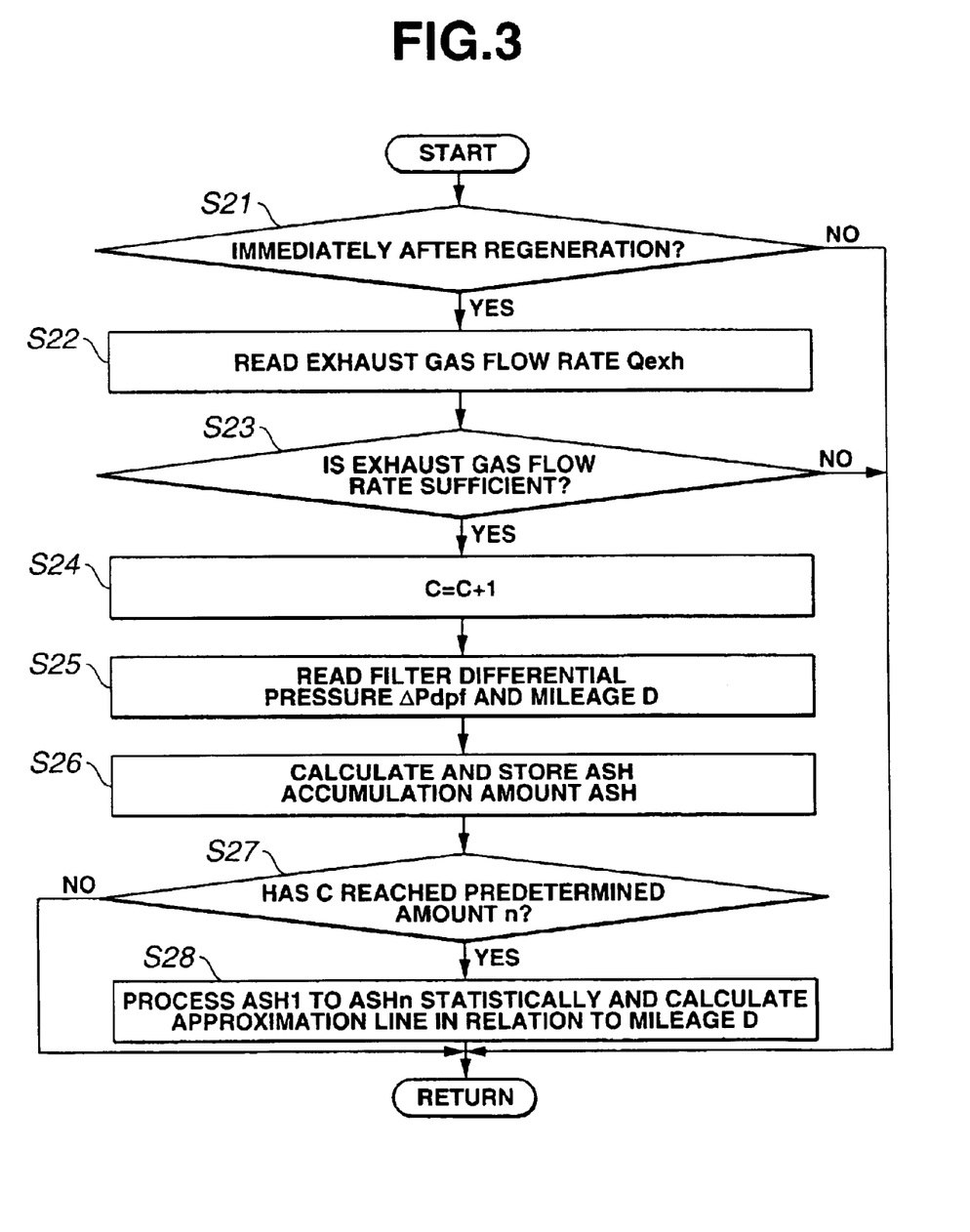
FIG. 3 is a flowchart illustrating an ash accumulation amount estimating routine.

If it is determined that diesel particulate filter 12 is regenerated (step S9) by the control as described above, ECU 21 estimates ash accumulation amount ASH in accordance with a flowchart of FIG. 3. ASH is a powdery residue resulting from burning of particulate and main substances of ash are calcium sulfate that is an incombustible component of particulate having been described hereinbefore, metal powders resulting from wearing off of sliding portions of engine 1, and rust of an exhaust manifold or a turbine housing.

In step S21, it is determined whether it is the time immediately after regeneration of diesel particulate filter 12. If the answer in step S21 is affirmative, the control proceeds to step S22. If the answer in step S21 is negative, the control returns. It is determined to be the time immediately after regeneration of diesel particulate filter 12 when regeration time determination flag F has been set to 0 and a predetermined time has not yet lapsed after regeneration time determination flag F has been changed from 1 to 0 or a mileage has not yet reached a predetermined amount.

In step S22, exhaust gas flow rate Qexh is read. In step S23, it is determined whether or not read exhaust gas flow rate Qexh has reached a predetermined value (i.e., whether or not the exhaust gas flow rate is sufficient). This determination aims at recognizing that a differential pressure suitable for measurement is generated between the inlet and outlet of diesel particulate filter 12. If the answer in step S23 is affirmative, the control proceeds to step S24. If the answer in step S23 is negative, the control returns.

Figure 4:
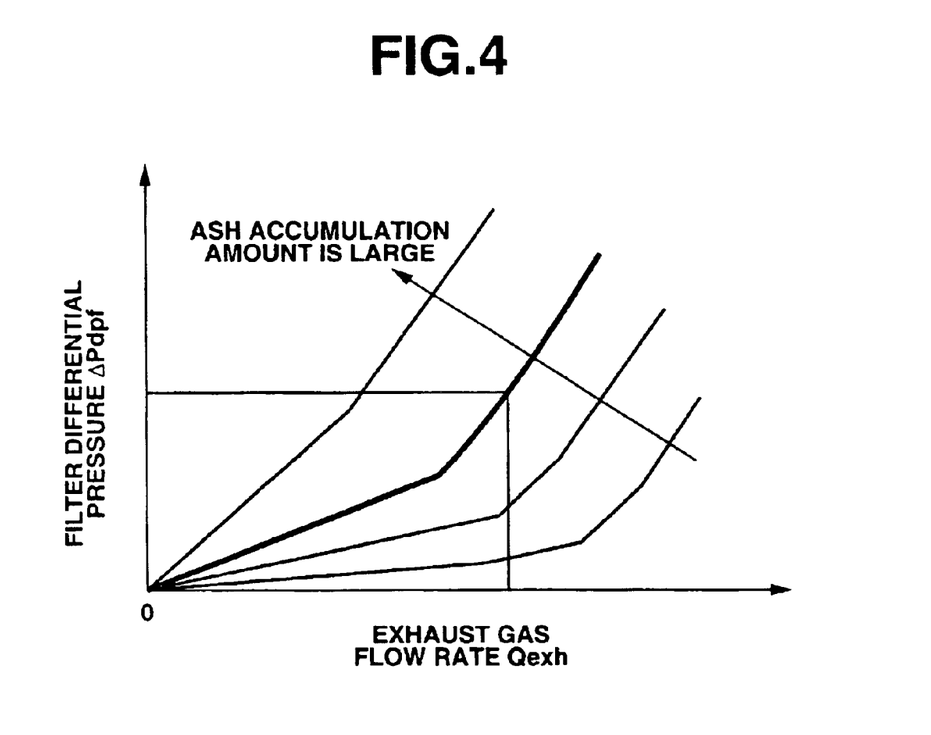
FIG. 4 is a graph of an ash accumulated amount in relation to an exhaust gas flow rate Qexh and a outlet of a diesel particulate filter.

In step S24, count value C is increased by 1. Count value C is initially set to 0 and is increased by one every time ash estimation amount ASH is estimated in the manner described above. Count value C is maintained even after stoppage of engine 1. In step S25, filter differential pressure $\Delta Pdpf$ and mileage D are read. Mileage D is set to 0 at the time of shipping of a vehicle or latest replacement of diesel particulate filter 12 and is calculated by accumulation of vehicle speed VSP (D=$\Sigma$(VSP×$\Delta t$) where $\Delta t$ is a calculation cycle). In step S26, ash accumulation amount ASH is estimated based on read filter differential pressure $\Delta Pdpf$ and exhaust gas flow rate Qexh. Estimation of ASH is performed by reference to a map (FIG. 4) wherein ASH is assigned to $\Delta Pdpf$ and Qexh. By this map, ASH is estimated to be a larger value as filter differential pressure $\Delta Pdpf$ becomes larger, under constant exhaust gas flow rate Qexh. For more accurate estimation, ASH read from the map is corrected based on filter inlet exhaust gas temperature Texhin and exhaust gas pressure Pexh. Estimated ASH is stored with relation to mileage at that time. In step S27, it is determined whether or not count value C has reached a predetermined value "n". If the answer in step S27 is affirmative, the control proceeds to step S28. If the answer in step S28 is negative, the control returns. Predetermined value "n" is set so as to be able to attain an accuracy necessitated for estimation of ash accumulation amount ASH that is performed by a statistic process as will be described later.

In step S28, latest "n" sets of mileages Di and ash accumulation amounts ASHi (I=1 to n) are subjected to a statistical process and an approximation line thereof is calculated. As an example, approximation of a linear relation between mileage D and accumulation amount ASH of ash by the least square method is expressed by the following equation. In the meantime, D0 and ASH0 are average values of D and ASH, respectively.

$$ASH = \alpha \times D + \beta \quad (1)$$

$$\alpha = \{\Sigma(D-D0) \times \Sigma(ASH-ASH0)\}/\Sigma\{(D-D0)^2\}$$

$$\beta = ASH0 - \alpha \times D0$$

When the estimation and statistical process of ash accumulation amount ASH are finished, ECU 21 determines that ash of the amount larger than a set reference value is accumulated on diesel particulate filter 12 and urges a driver to replacement of diesel particulate filter 12.

Figure 5:
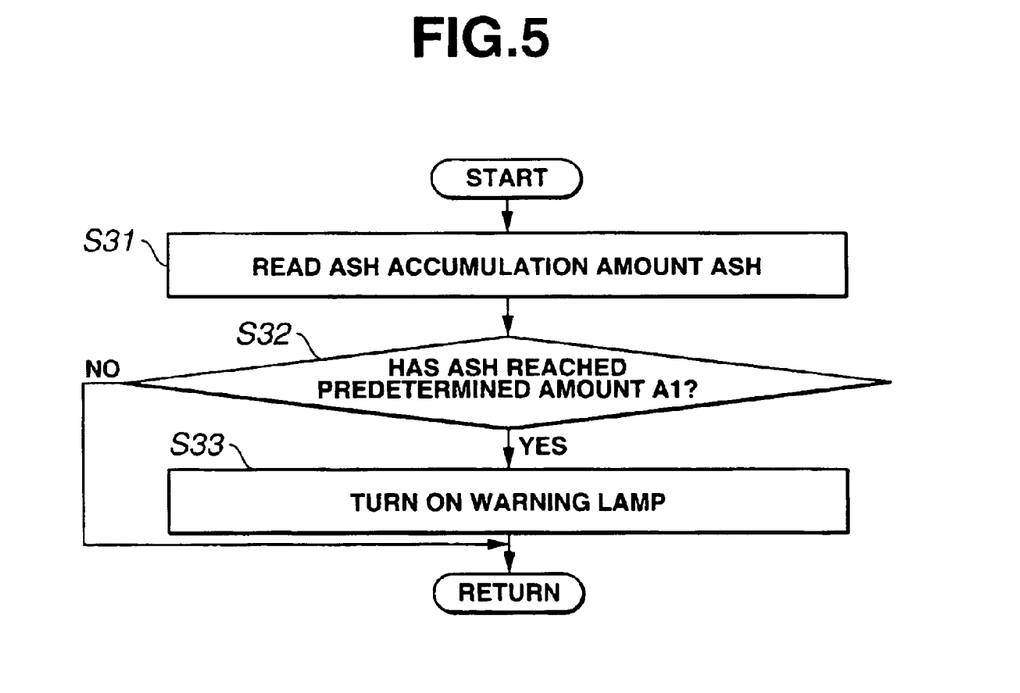
FIG. 5 is a flowchart illustrating a warning lamp control routine.

In step S31 of the flowchart of FIG. 5, ash accumulation amount ASH is read. ASH is calculated based on mileage D from the above-described equation (1) so as to indicate present ash accumulation amount ASH. In step S32, it is determined whether estimated ASH has reached predetermined amount A1 that is a design criterion. If it is determined that ASH has reached A1, the control proceeds to S33. If not, the control returns. In step S33, warning lamp 51 (refer to FIG. 1) disposed within the vehicle cabin is turned on.

Figure 2:
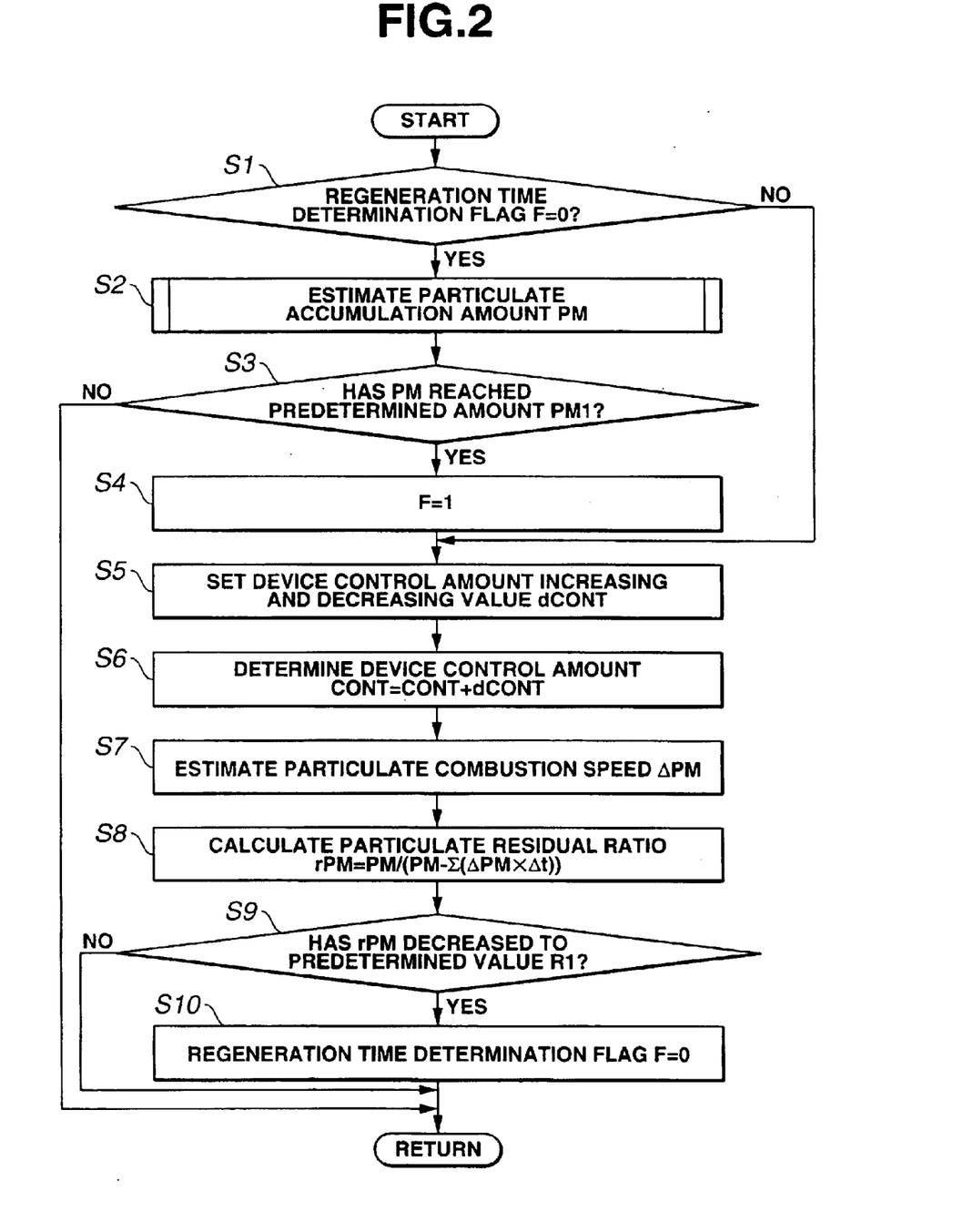
FIG. 2 is a flowchart illustrating a regeneration control routine.
Figure 6:
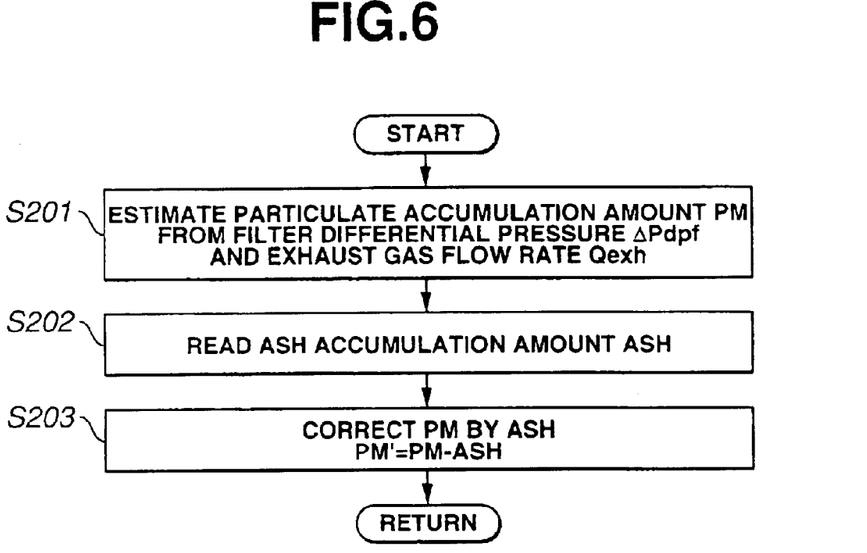
FIG. 6 is a flowchart illustrating a particulate accumulation amount estimating routine.

FIG. 6 shows a flowchart showing the details of step S2 of the flowchart of FIG. 2. In step S201, filter differential pressure ΔPdpf and exhaust gas flow rate Qexh are read. Based on ΔPdpf and Qexh is estimated particulate accumulation amount PM. Estimation of PM is performed by reference to a map wherein PM is assigned to ΔPdpf and Qexh. In step 202, ash accumulation amount ASH is read. Ash accumulation amount ASH is calculated similarly from the above-described equation (1). In step S203, final particulate accumulation amount PM' (=PM−ASH) is estimated by subtracting ASH from estimated PM. In step S3 of the flowchart of FIG. 2, it is determined based on thus estimated final particulate accumulation amount PM' the time to regenerate diesel particulate filter 12.

In this embodiment, steps S1, S2 of the flowchart of FIG. 2 and the entire flowchart of FIG. 6 constitute a regeration time determining means, steps S5, S6 of the flowchart of FIG. 2 constitute a regeneration control means, steps S7 to S9 of the flowchart of FIG. 2 constitute a regeneration completion determining means, step S25 of the flowchart of FIG. 3 and sensor 33 constitute a filter differential pressure detecting means, steps S24, S26 to S28 of the flowchart of FIG. 3 constitute ash accumulation amount estimating means, and the entire flowchart of FIG. 5 constitute a warning means.

By this embodiment, the following effects can be obtained.

Firstly, the embodiment is adapted to burn accumulated particulate, then detect filter differential pressure ΔPdpf immediately after diesel particulate filter 12 is regenerated and estimate ash accumulation amount ASH based on detected ΔPdpf, Thus, without considering the consumption and kind of engine oil, ash accumulation amount ASH can be estimated accurately.

Secondly, the embodiment is adapted to detect filter differential pressure ΔPdpf each time and immediately after diesel particulate filter 12 is regenerated while storing detected ΔPdpf and estimate present ash accumulation amount ASH by an approximation equation that is obtained by a statistical process of "n" sets of data. By this, an error of ash accumulation amount ASH that is estimated based on filter differential pressure ΔPdpf can be made small, thus making it possible to replace diesel particulate filter 12 at a suitable time.

Figure 7:
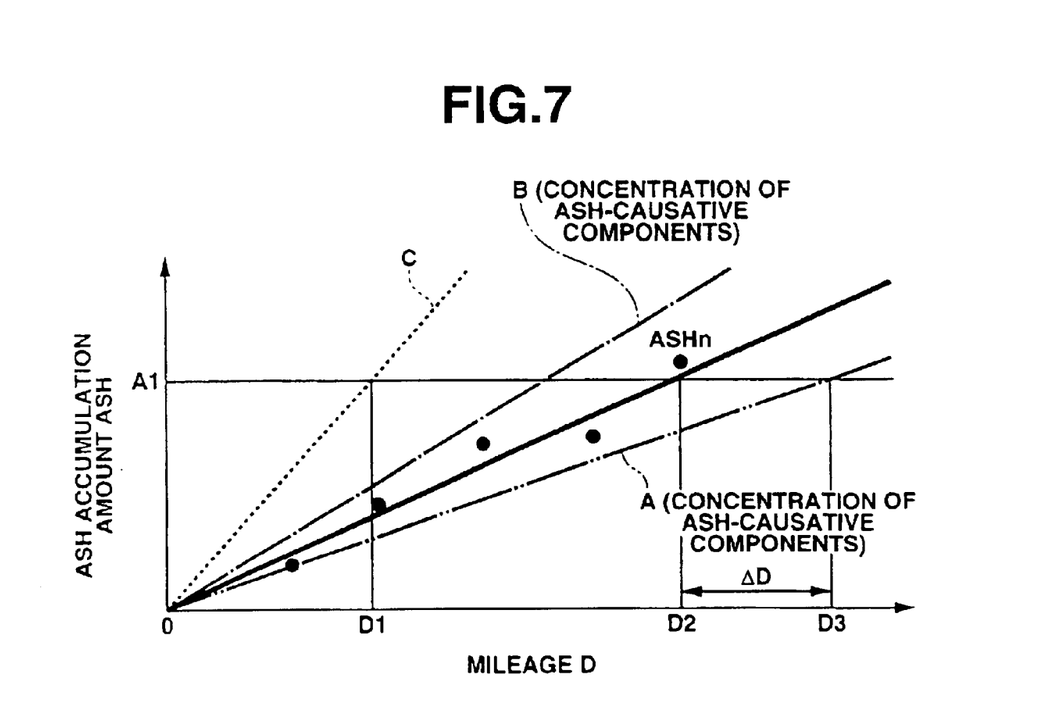
FIG. 7 is a graph showing a variation of an ash accumulation amount ASH in response to a variation of a concentration of ash-causative components in engine oil.

FIG. 7 shows a relation between ash accumulation amount ASH and mileage D of the vehicle, in which ash accumulation amount ASH that is estimated according to this embodiment is indicated by the solid line (i.e., that is approximated by the statistical process). Ash accumulation amount under the same mileage varies depending upon a variation of a concentration of an ash-causative components of engine oil and becomes smaller as that concentration becomes lower as indicated by two-dot chain line A. Accordingly, by estimating ash accumulation amount ASH accurately, mileage D at which diesel particulate filter 12 is to be replaced can be extended if the concentration of ash-causative components of engine oil is low. If accurate estimation of ash accumulation amount ASH is not obtained assuredly, replacement of engine particulate filter 12 is determined by the assumption that engine oil of a maximum concentration of ash-causative components is used as indicated by dotted line C. This results in that diesel particulate filter 12 is replaced with a considerable margin since the time to replace the filter has not yet been reached and therefore such replacement is uneconomical.

Figure 8:
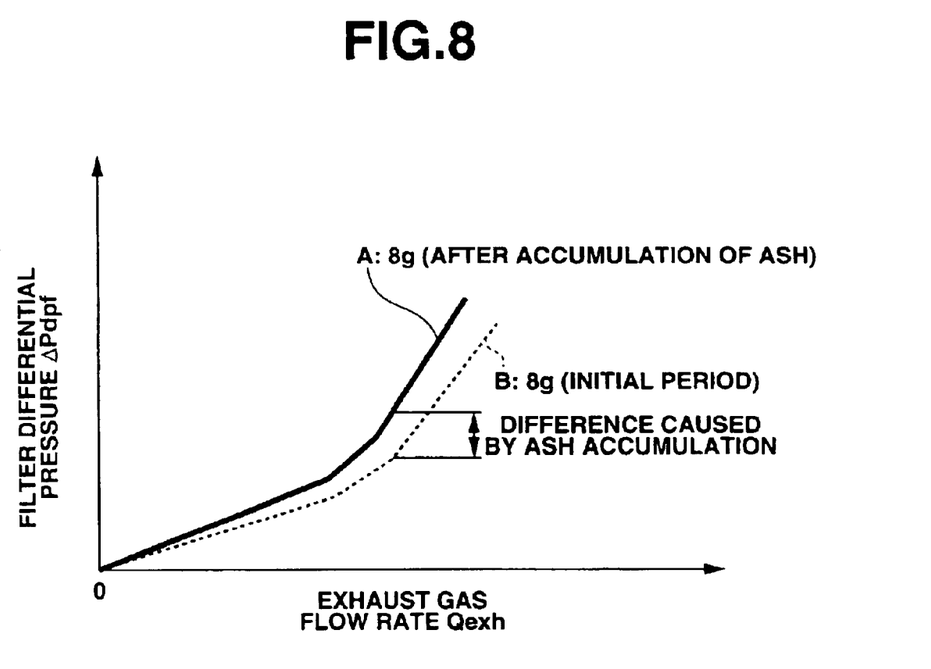
FIG. 8 is a graph showing a variation of the differential pressure between the inlet and outlet of the diesel particulate filter in response to a variation of the ash accumulation amount.

Thirdly, by the embodiment, present ash accumulation amount ASH is estimated by an approximation equation. The value obtained by subtracting present ash accumulation amount ASH from particulate accumulation amount PM that is estimated based on filter differential pressure ΔPdpf is estimated as final particulate accumulation amount PM'. By this, it becomes possible to estimate particulate accumulation amount PM' with a high accuracy as compared with the case in which particulate accumulation amount is estimated simply from filter differential pressure ΔPdpf, thus making it possible to regenerate diesel particulate filter 12 at the more appropriate time. This is because under the condition where ash is accumulated, filter differential pressure ΔPdpf that is generated under the same exhaust gas flow rate Qexh and the same particulate accumulation amount PM is increased as shown in FIG. 8.

The entire contents of Japanese Patent Applications P2003-001973(filed Jan. 8, 2003) are incorporated herein by reference.

Although the invention has been described above by reference to a certain embodiment of the invention, the invention is not limited to the embodiment described above. Modifications and variations of the embodiment described above will occur to those skilled in the art, in light of the above teachings. For example, while the embodiment has been described with respect to the case where present ash accumulation amount ASH is estimated by approximating the relation between ash accumulation amount ASH and mileage D, mileage D may be replaced by engine oil consumption Coil so that present ash accumulation amount ASH is estimated by approximating the relation between ash accumulation amount ASH and engine oil consumption Coil. The scope of the invention is defined with reference to the following claims.

What is claimed is:

1. An exhaust gas purification method for an internal combustion engine having a particulate filter disposed in an exhaust passage of the engine and trapping particulate in an exhaust gas, the method comprising:

executing a control for burning particulate accumulated on the particulate filter and thereby regenerating the particulate filter;

determining whether regeneration of the particulate filter is completed;

detecting a filter differential pressure between an inlet and an outlet of the particulate filter immediately after it is determined that regeneration of the particulate filter is completed; and estimating an ash accumulation amount that is an amount of ash accumulated on the particulate filter based on the detected filter differential pressure;

wherein the estimating of the ash accumulation amount comprises calculating, based on a plurality of filter differential pressures which are caused at different times when the particulate filter is regenerated, but each of which is detected immediately after it is determined that regeneration of the particulate filter is completed, an approximation line representative of a relation between the ash accumulation amount and a mileage of a vehicle associated with the internal combustion engine, and estimating a present ash accumulation amount from the calculated approximation line and a present mileage of the vehicle.

2. An exhaust gas purification method according to claim 1, further comprising turning on a warning lamp when the estimated ash accumulation amount reaches a predetermined value to urge a driver to replace the particulate filter.

3. An exhaust gas purification method according to claim 1, further comprising estimating a particulate accumulation amount and determining a time to regenerate the particulate filter based on the estimated particulate accumulation amount.

4. An exhaust gas purification method according to claim 3, wherein the estimated particulate accumulation amount is a final particulate estimation amount that is obtained by correcting a particulate accumulation amount that is estimated based on the filter differential pressure by the ash accumulation amount.

5. An exhaust gas purification system for an internal combustion engine comprising:

a particulate filter that is disposed in an exhaust passage of the engine and traps particulate in an exhaust gas;

regeneration control means that executes a control for burning particulate accumulated on the particulate filter and thereby regenerating the particulate filter;

regeneration completion determining means that determines whether regeneration of the particulate filter is completed;

filter differential pressure detecting means that detects a filter differential pressure that is a differential pressure between an inlet and outlet of the particulate filter immediately after it is determined that the regeneration of the particulate filter is completed; and ash accumulation amount estimating means that estimates an ash accumulation amount that is an amount of ash accumulated on the particulate filter based on the detected filter differential pressure;

wherein the ash accumulation amount estimating means calculates, based on a plurality of filter differential pressures which are caused at different times when the particulate filter is regenerated, but each of which is detected immediately after it is determined that regeneration of the particulate filter is completed, an approximation line representative of a relation between the ash accumulation amount and a mileage of a vehicle associated with the internal combustion engine, and estimates a present ash accumulation amount from the calculated approximation line and a present mileage of the vehicle.

6. An exhaust gas purification system for an internal combustion engine comprising:

a particulate filter that is disposed in an exhaust passage of the engine and traps particulate in an exhaust gas;

a sensor that detects a filter differential pressure between an inlet and an outlet of the particulate filter; and a controller that controls regeneration of the particulate filter;

the controller being programmed to:

execute a control for burning particulate accumulated on the particulate filter and thereby regenerating the particulate filter;

determine whether regeneration of the particulate filter is completed;

detect, in cooperation with the sensor, the filter differential pressure immediately after it is determined that the regeneration of the particulate filter is completed; and estimate an ash accumulation amount based on the detected filter differential pressure;

wherein the controller is programmed to calculate, based on a plurality of filter differential pressures which are caused at different times when the particulate filter is regenerated, but each of which is detected immediately after it is determined that regeneration of the particulate filter is completed, an approximation line representative of a relation between the ash accumulation amount and a mileage of a vehicle associated with the internal combustion engine, and estimate a present ash accumulation amount from the calculated approximation line and a present mileage of the vehicle.

7. An exhaust gas purification system according to claim 6, further comprising a warning device that is turned on when the estimated ash accumulation amount reaches a predetermined value to urge a driver to replace the particulate filter.

8. An exhaust gas purification system according to claim 6, wherein the controller is programmed to estimate a particulate accumulation amount and determine a time to regenerate the particulate filter based on the estimated particulate accumulation amount.

9. An exhaust gas purification system according to claim 8, wherein the particulate accumulation amount is a final particulate accumulation amount that is obtained by correcting an estimated particulate accumulation amount that is estimated based on the filter differential pressure by the estimated ash accumulation amount.

10. An exhaust gas purification system for an internal combustion engine comprising:

a particulate filter that is disposed in an exhaust passage of the engine and traps particulate in an exhaust gas; and a controller that controls regeneration of the particulate filter;

the controller being programmed to:

execute a control for burning particulate accumulated on the particulate filter and thereby regenerating the particulate filter;

detect a differential pressure between an inlet and an outlet of the particulate filter immediately after the particulate filter is regenerated; and determine a time to take action against ash accumulated on the particulate filter based on the detected filter differential pressure;

wherein the controller is programmed to calculate, based on a plurality of filter differential pressures which are caused at different times when the articulate filter is regenerated, but each of which is detected immediately after it is determined that regeneration of the particulate filter is completed, an approximation line representative of a relation between the ash accumulation amount and a mileage of a vehicle associated with the internal combustion engine, and estimate a present ash accumulation amount from the calculated approximation line and a present mileage of the vehicle.

* * * * *